United States Patent
Brockmeier et al.

(10) Patent No.: US 10,112,861 B2
(45) Date of Patent: Oct. 30, 2018

(54) METHOD OF MANUFACTURING A PLURALITY OF GLASS MEMBERS, A METHOD OF MANUFACTURING AN OPTICAL MEMBER, AND ARRAY OF GLASS MEMBERS IN A GLASS SUBSTRATE

(71) Applicant: Infineon Technologies AG, Neubiberg (DE)

(72) Inventors: Andre Brockmeier, Villach (AT); Alexander Breymesser, Villach (AT); Carsten Von Koblinski, Bodensdorf (AT); Francisco Javier Santos Rodriguez, Villach (AT); Peter Zorn, Villach (AT)

(73) Assignee: Infineon Technologies AG, Neubiberg (DE)

( * ) Notice: Subject to any disclaimer, the term of this patent is extended or adjusted under 35 U.S.C. 154(b) by 463 days.

(21) Appl. No.: 14/813,677

(22) Filed: Jul. 30, 2015

(65) Prior Publication Data

US 2017/0029311 A1    Feb. 2, 2017

(51) Int. Cl.
C03B 23/03    (2006.01)
C03B 11/08    (2006.01)

(52) U.S. Cl.
CPC ............ *C03B 11/08* (2013.01); *C03B 11/082* (2013.01); *C03B 11/084* (2013.01); *C03B 2215/06* (2013.01); *C03B 2215/07* (2013.01); *C03B 2215/414* (2013.01)

(58) Field of Classification Search
CPC .......... C03B 23/0302; C03B 2215/404; C03B 2215/41; C03B 2215/412; C03B 2215/80; C03B 2215/86
See application file for complete search history.

(56) References Cited

U.S. PATENT DOCUMENTS

| 5,805,361 | A * | 9/1998 | Morimoto ............ G02B 5/1857 |
| | | | 359/819 |
| 2004/0079114 | A1 * | 4/2004 | Aitken .................. C03B 11/082 |
| | | | 65/64 |
| 2007/0056325 | A1 * | 3/2007 | Wang .................... C03B 11/082 |
| | | | 65/305 |
| 2007/0256453 | A1 | 11/2007 | Barnes et al. |

(Continued)

FOREIGN PATENT DOCUMENTS

DE    112012005570 T5    11/2014
JP    2000281364 A    10/2000

*Primary Examiner* — Cynthia Szewczyk
(74) *Attorney, Agent, or Firm* — Murphy, Bilak & Homiller, PLLC (57) ABSTRACT

A method of manufacturing a plurality of glass members comprises bringing a first main surface of a glass substrate in contact with a first working surface of a first mold substrate, the first working surface being provided with a plurality of first protruding portions, and bringing a second main surface of the glass substrate in contact with a second working surface of a second mold substrate, the second working surface being provided with a plurality of second protruding portions. The method further comprises controlling a temperature of the glass substrate to a temperature above a glass-transition temperature to form the plurality of glass members, removing the first and the second mold substrates from the glass substrate, and separating adjacent ones of the plurality of glass members.

21 Claims, 8 Drawing Sheets

(56) References Cited

U.S. PATENT DOCUMENTS

| | | |
|---|---|---|
| 2009/0194666 A1 | 8/2009 | Takamoto |
| 2013/0234297 A1 | 9/2013 | Breymesser et al. |
| 2013/0237034 A1 | 9/2013 | Breymesser et al. |
| 2013/0239617 A1* | 9/2013 | Dannoux ................ C03B 23/02 65/31 |
| 2015/0175467 A1 | 6/2015 | Denifl et al. |

* cited by examiner

METHOD OF MANUFACTURING A PLURALITY OF GLASS MEMBERS, A METHOD OF MANUFACTURING AN OPTICAL MEMBER, AND ARRAY OF GLASS MEMBERS IN A GLASS SUBSTRATE

BACKGROUND

Optical members such as mirrors or prisms have been manufactured using methods such as etching, e.g., wet etching or plasma assisted etching, as well as using mechanical methods such as sawing, laser processing. Novel methods are being developed for patterning glass to a three-dimensional shape.

SUMMARY

According to an embodiment, a method of manufacturing a plurality of glass members includes bringing a first main surface of a glass substrate in contact with a first working surface of a first mold substrate, the first working surface being provided with a plurality of first protruding portions, and bringing a second main surface of the glass substrate in contact with a second working surface of a second mold substrate, the second working surface being provided with a plurality of second protruding portions. The method further includes controlling a temperature of the glass substrate to a temperature above a glass-transition temperature to form the plurality of glass members, removing the first and the second mold substrates from the glass substrate, and separating adjacent ones of the plurality of glass members.

According to a further embodiment, a method of manufacturing a plurality of optical members includes patterning a first working surface of a first mold substrate to form a plurality of first protruding portions, bringing a first main surface of a glass substrate in contact with the first working surface of the first mold substrate, and bringing a second main surface of the glass substrate in contact with a second working surface of a second mold substrate. The method further includes controlling a temperature of the glass substrate to a temperature above a glass-transition temperature to form a plurality of optical members, and separating adjacent ones of the plurality of optical members.

According to a further embodiment, an array of glass members arranged in a glass substrate includes a plurality of depressions formed in a first main surface of the glass substrate, and a plurality of openings formed in a second main surface of the glass substrate.

Those skilled in the art will recognize additional features and advantages upon reading the following detailed description and on viewing the accompanying drawings.

BRIEF DESCRIPTION OF THE DRAWINGS

The accompanying drawings are included to provide a further understanding of the invention and are incorporated in and constitute a part of this specification. The drawings illustrate the embodiments of the present invention and together with the description serve to explain principles of the invention. Other embodiments of the invention and intended advantages will be readily appreciated as they become better understood by reference to the following detailed description.

FIGS. 3A to 3O show further elements of a method of manufacturing an optical member, according to embodiments.

DETAILED DESCRIPTION

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. It is to be understood that other embodiments may be utilized and structural or logical changes may be made without departing from the scope defined by the claims.

The description of the embodiments is not limiting. In particular, elements of the embodiments described hereinafter may be combined with elements of different embodiments.

The terms "lateral" and "horizontal" as used in this specification intends to describe an orientation parallel to a first surface of a substrate, e.g., a glass. This can be, for instance, the planar surface of a piece of glass.

The term "vertical" as used in this specification intends to describe an orientation which is arranged perpendicular to the first surface of the glass substrate.

Figure 1A:
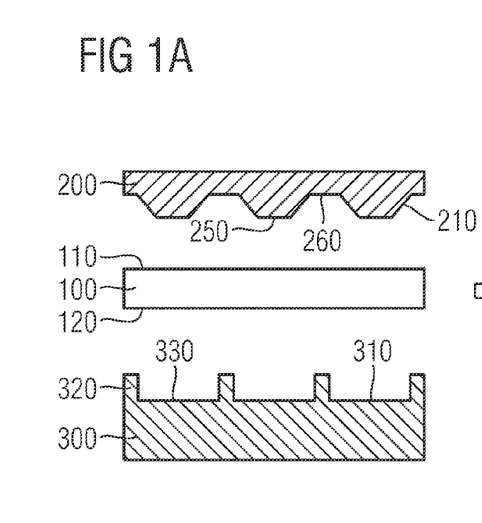
FIGS. 1A to 1C show elements of a method of manufacturing a plurality of glass members, according to an embodiment.
Figure 1B:
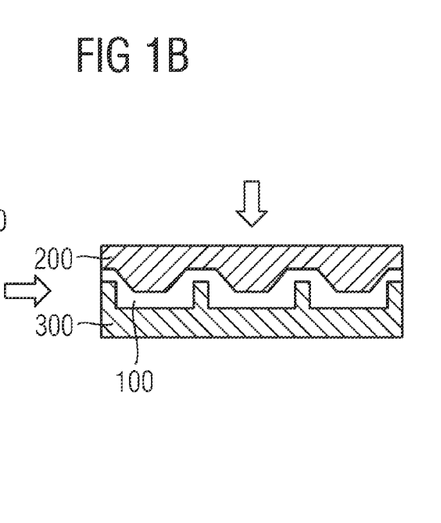
Figure 1C:
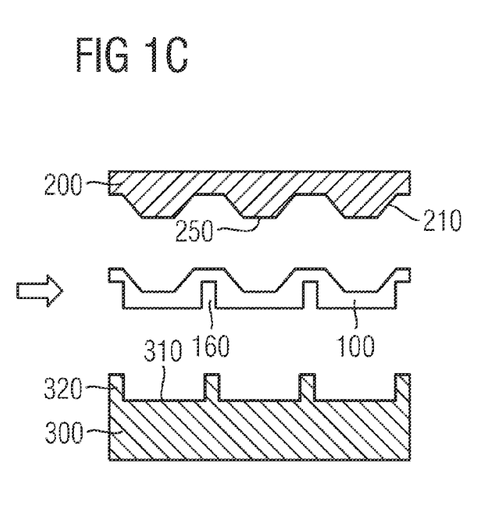

FIGS. 1A to 1C illustrate a method according to an embodiment. As will be explained in the following, a method of manufacturing a glass member comprises bringing a first main surface 110 of a glass substrate 100 in contact with a first working surface 210 of a first mold substrate 200, the first working surface 210 being provided with a plurality of first protruding portions 250. The method further comprises bringing a second main surface 120 of the glass substrate 100 in contact with a second working surface 310 of a second mold substrate 300, the second working surface being provided with a plurality of second protruding portions 320.

FIG. 1A shows an example of the glass substrate 100, the first mold substrate 200 and the second mold substrate 300. First cavities 260 are disposed between adjacent first protruding portions 250 in the first working surface 210. Second cavities 330 are disposed between adjacent second protruding portions 320 in the second working surface 310. Bringing the first main surface 110 of the glass substrate 100 in contact with the first working surface 210 and bringing the second main surface 120 of the glass substrate 100 in contact with the second main surface 120 of the glass substrate 100 may be accomplished so that the first mold substrate 200 and the second mold substrate 300 are appropriately aligned. According to an embodiment that will be explained later with reference to FIGS. 3A to 3C, the second protruding portions 320 of the second mold substrate 300 may define the positions at which the single glass members may be separated, whereas the first protruding portions 250 of the first mold substrate 200 define depressions in the glass members. Accordingly, the first and the second mold substrates 200, 300 may be correspondingly aligned. For example, this may be accomplished by optical inspection of alignment marks. According to an example, these alignment marks may be formed by laser treatment or etching. According to further embodiments, the first and second mold substrates 200, 300 may be mechanically aligned, e.g. magnetically or using pins. A pre-alignment by automatic handling may also be performed.

As is further illustrated in FIG. 1B, after bringing the glass substrate 100, the first and the second mold substrate 200, 300 in contact, the temperature of the glass substrate is controlled to a temperature above a glass-transition temperature. At the glass transition temperature, a transition from the glass material to a molten or a doughy-like state may take place. As a consequence, the molten or liquefied glass fills the first cavities 260 in the first working surface. In a corresponding manner, a depression is formed in the first main surface 110 at the portion of a protruding portion 250 of the first working surface 210 of the first mold substrate.

In a corresponding manner, the second main surface 120 is patterned due to the contact with the second working surface 310 of the second mold substrate 300. In particular, openings 160 are formed in the second main surface 120 at a position of the second protruding portions 320.

After cooling the stack comprising the glass substrate, the first and the second mold substrates 200, 300, the glass substrate solidifies and the first and the second mold substrates 200, 300 are removed from the glass substrate. As a result, depressions 150 are formed in the first main surface 110 of the glass substrate 100. Further, corresponding openings 160 are formed in the second main surface 120 of the glass substrate 100. FIG. 1C shows an example of the glass substrate after removing the first and the second mold substrates 200, 300 from the glass substrate 100.

Generally, within the context of the present application, the term "glass substrate" is to be understood to comprise any amorphous (non-crystalline) solid material that may be transparent and may be, for example, used in the field of optoelectronics. The glass may be based on silicon dioxide. Specific embodiments comprise soda-lime glass, float glass, quartz glass and further examples such as porcelains, polymer thermoplastics, polymer glasses, acrylic glass, polycarbonate, polyethylene terephthalate.

The glass substrate may comprise a quartz glass, e.g., undoped silica, or silica doped with at least one dopant, the dopant(s) being selected from a group containing boron (B), sodium (Na), calcium (Ca), potassium (K) and aluminum (Al), (zinc (Zn), copper (Cu), magnesium (Mg), germanium (Ge). According to further embodiments, the glass substrate may comprise a polymer, for example polynorbornene, polystyrene, polycarbonate, polyimide, or benzocyclobutene.

At the glass transition temperature, there is a transition from a hard and relatively brittle state into a molten or doughy-like state. For example, the glass substrate deforms when being subjected to a force. Examples of the glass transition temperature are 520 to 600° C. for soda-lime glass, approximately 1200° for fused quartz and 145° for polycarbonate. For example, at the glass transition temperature, the viscosity of the glass substrate may be in a range of $10^{12}$ to $10^{13.5}$ dPa·s.

According to an embodiment, the first and the second mold substrates 200, 300 may be pressed together while the temperature of the glass substrate is controlled to a temperature above the glass-transition temperature. For example, an external pressure that is applied between the first and the second mold substrates 200, 300 may be in a range of 2 to 8 kN/cm$^2$. As will be readily appreciated, the pressure may be lower than 2 kN/cm$^2$, and the glass substrate may be heated to a higher temperature. For example, the glass substrate may be heated to a temperature above the Littleton Point. At the Littleton Point, the viscosity of the glass may be approximately $10^{7.6}$ dPA·s. For example, in this case the weight of the first and the second mold substrates may be sufficient so that liquefied glass flows and fills the cavities and openings in the first and the second mold substrates. For example, in this case, no external pressure may be applied.

For example, the glass substrate may be implemented as a planar substrate made of glass. According to a further embodiment, the glass substrate may comprise a powder, a glass frit or glass pellets, which are brought into contact with the mold substrate.

The first and second mold substrates may comprise a metal, for example stainless steel or steel or non-metal compound such as Silicon (Si) or ceramics. The first working surface 210 of the first mold substrate 200 may be processed by forming cavities 260 and/or protruding portions 250. For example, the first working surface 210 may be processed using patterning methods such as etching or mechanical methods, e.g., milling or powder blasting, to form the protruding portions 250 and the cavities 260. In particular, hard mask layers may be formed over the first working surface 210 to further pattern the first working surface 210. Etching processes may be used that may form a predefined angle with respect to a horizontal surface of the first mold substrate. This may be useful when the mold substrate comprises silicon. Further examples of the material of the mold substrate comprise ceramics, which may have a high melting temperature. The second mold substrate may be made of the same material as the first mold substrate or from a different material.

A size of the first and second mold substrates 200, 300 may be approximately equal to a size of the glass substrate 100.

A releasing agent, e.g., an anti-sticking layer is formed over the first working surface. For example, the releasing agent may comprise a carbon compound, e.g. graphene, pyrolytic carbon, metal carbides, e.g., tungsten carbide (WC) or glassy carbon or boron nitride (BN).

The first working surface 210 may be processed and patterned, e.g., to form protruding portions 250 and cavities 260 between protruding portions. For example, the protruding portions may have an arbitrary shape and the cavities.

Figure 2A:
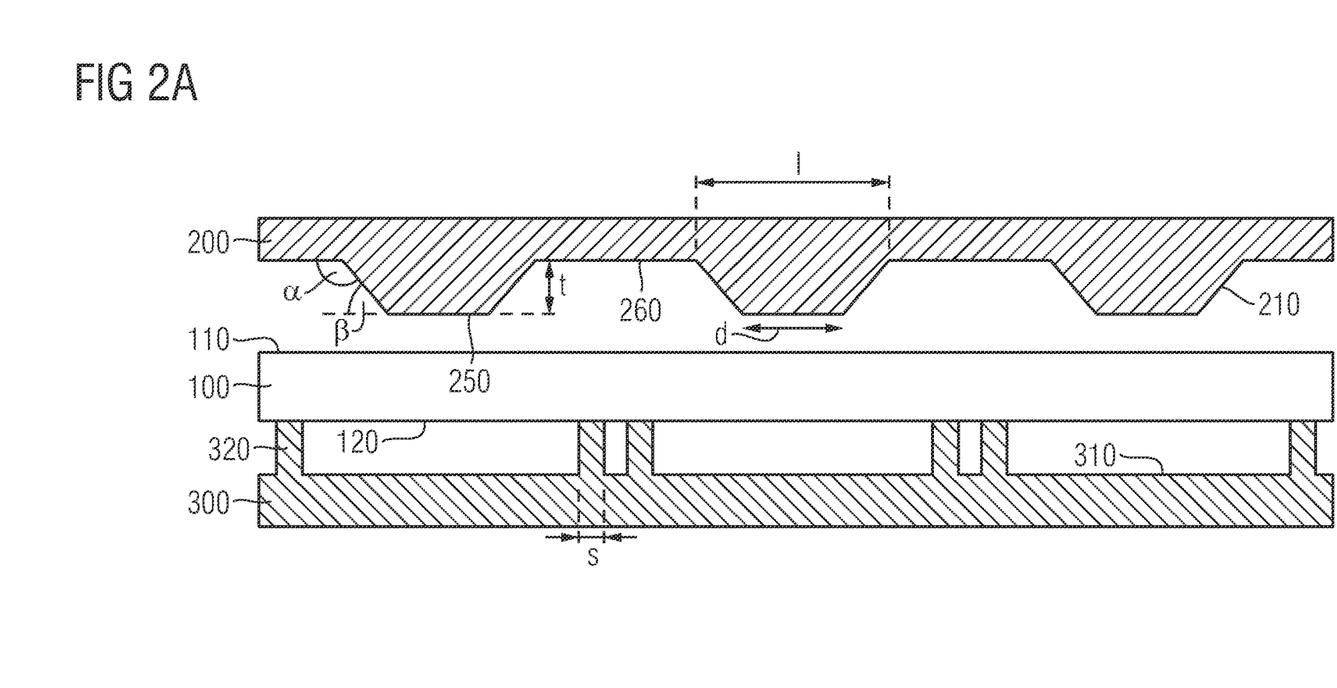
FIGS. 2A to 2D show further details of a method of manufacturing an optical member, according to an embodiment.

FIG. 2A shows further examples of protruding portions and cavities. For example, the protruding portions may have the shape of a trapezoid having two bases and two legs. Generally, the term "trapezoid" refers to a quadrilateral with at least one pair of parallel sides. A shorter base of the trapezoid may have a length d in a range of approximately 50 μm to 10 mm, the larger base of the trapezoid may have a length l in a range of approximately 50 μm to 10 mm. A depth t of the trapezoid may be in a range of approximately 10 to more than 10000 μm, e.g. in a range of 10 to 5000 μm. The angle $\beta$ may be in a range of 20 to 90° and $\alpha=180-\beta$.

The patterning process for patterning the first working surface 210 may be performed so that the legs define a certain angle, e.g., with respect to each of the bases. As is illustrated in FIG. 2A, an angle between the leg and a horizontal line parallel to the bases may be $\alpha$ and $\beta$. Depending on the properties of the optical member to be formed, the angles $\beta$ and $\alpha$ may be appropriately selected. The second working surface of the second mold substrate may be processed in a corresponding manner. For example, the second working surface 310 may be patterned according to the needs of the manufacturing process.

As is to be readily understood, the cavities, depressions and protruding portions may have any different kind of geometric shape.

For example, second protruding portions 320 are defined in the second working surface 310 of the second mold substrate. The second protruding portions 320 of the second mold substrate 300 may define an edge area of the optical element, e.g. a kerf.

Figure 2B:
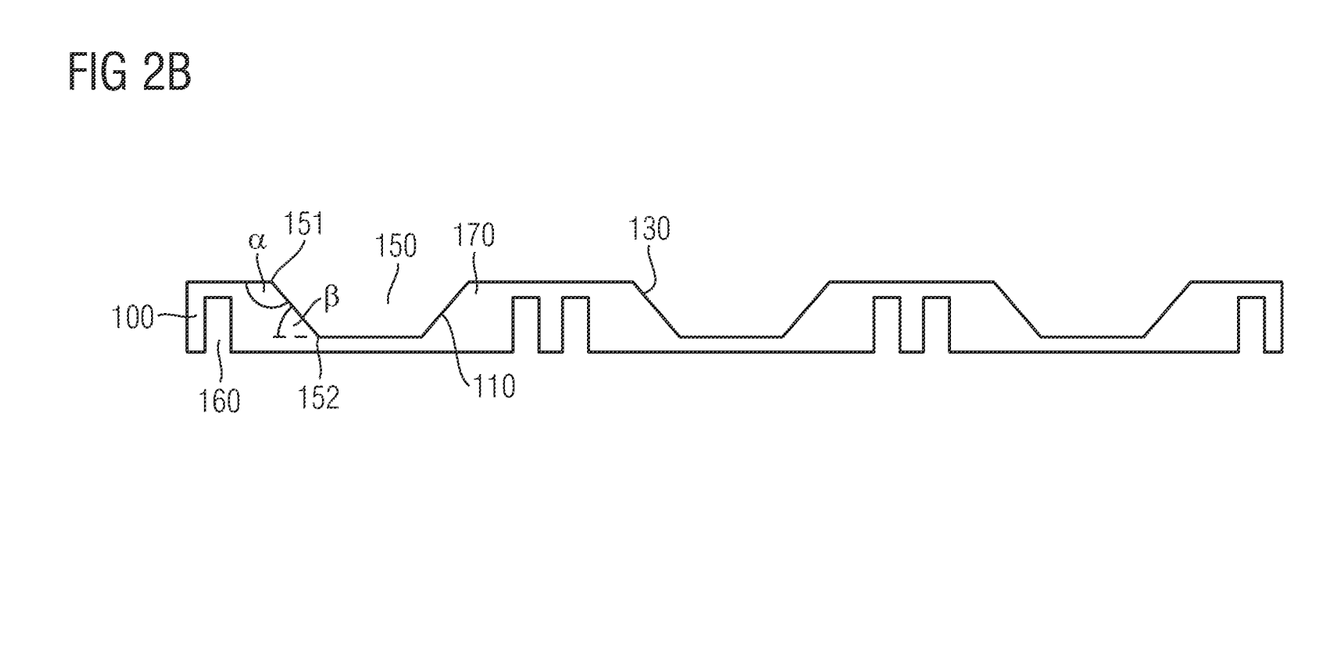

FIG. 2B shows an example of a glass substrate 100 after having been brought into contact with the first mold substrate 200 and the second mold substrate 300. The glass substrate, the first and the second mold substrates 200, 300 are selected so that a plurality of optical elements may be processed in parallel. Accordingly, as is also shown in FIG. 2B, a plurality of depressions 150 are formed in the first main surface 110 of the glass substrate 100. As is further illustrated in FIG. 2B, the angles $\alpha$ and $\beta$ at the corners 151 and 152 are transferred into the glass substrate 100. Further, the second main surface 120 of the glass substrate 100 is patterned to form depressions 150 corresponding to the protruding portions 320 of the second mold substrate 300.

FIG. 2B shows an array of glass members 170 arranged in a glass substrate. As is shown, the array of glass members 170 comprises a plurality of depressions 150 formed in a first main surface 110 of the glass substrate and a plurality of depressions 160 formed in a second main surface 120 of the glass substrate 100. As is also shown in FIG. 2B, a surface portion 130 of the glass substrate 100 forming a sidewall or a surface of the depression 150 implements an active surface of the optical components. The glass members may be optical components such as prisms. The term "active surface" is understood to represent a light reflective or light transmissive surface. Generally, strict demands with respect to quality of these active surfaces have to be met. In particular, active surfaces should have a low degree of surface roughness so as to enable a specular reflection. Due to the fact that the active surface forms a sidewall or surface of the depression 150, the first main surface 110 of the glass substrate 100 may be processed using mechanical methods such as grinding or a CMP process without affecting the active surface of the optical component.

Figure 2C:
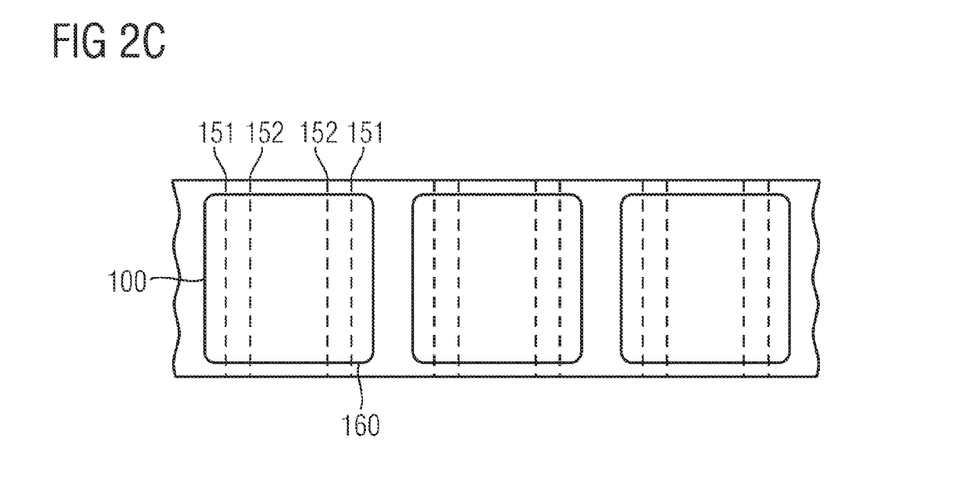

FIG. 2C shows a portion of a plan view of a second main surface of an example of the glass substrate which has been processed by the method as described hereinabove. Components at the first main surface 110 of the glass substrate 100 are indicated by broken lines. For the sake of simplicity, only a row of adjacent optical members disposed within one glass substrate is shown. As is clearly to be understood, the pattern may be repeated along the horizontal and the vertical axes thereof. As is shown, the kerf 160 may be formed so as to have a closed shape (e.g., rectangular or circular shape). The broken lines indicate the position of the depressions 150 formed in the first main surface of the glass substrate.

Figure 2D:
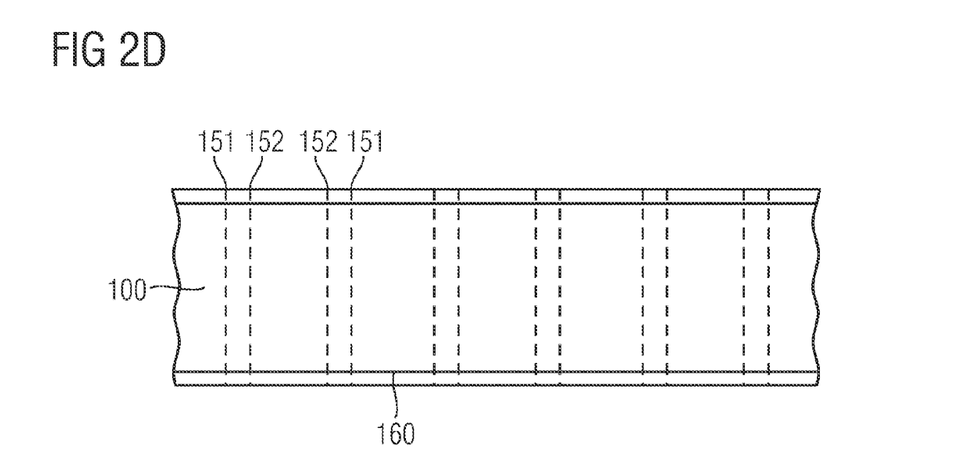

According to the embodiment shown in FIG. 2D, the kerf 160 may run in one direction only. In this case, adjacent optical members may be separated from each other by means of sawing. Another possibility for separation is scribing and/or breaking.

Figure 3A:
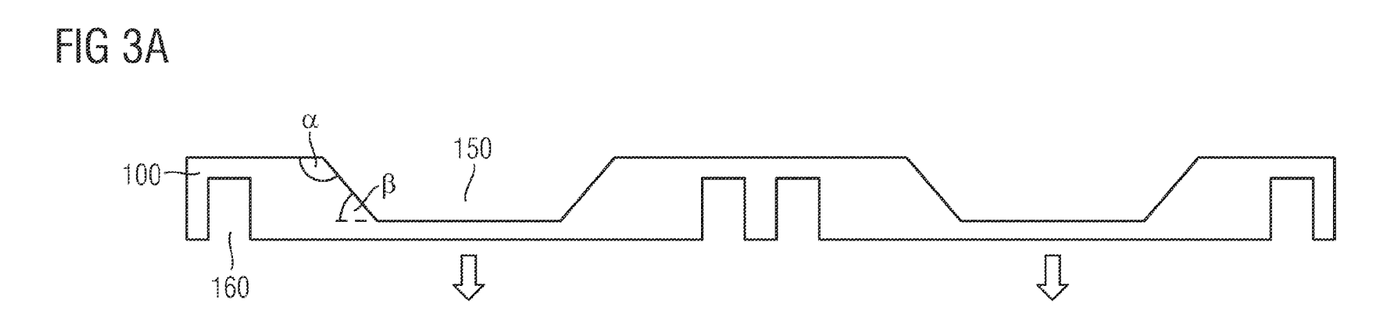
Figure 3B:
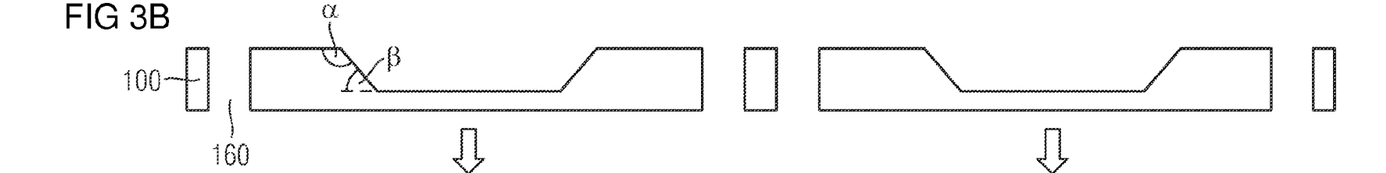
Figure 3C:
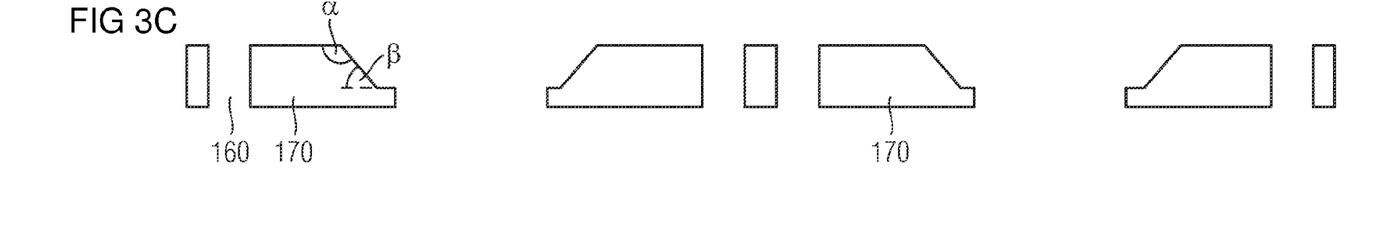

FIGS. 3A to 3C show further elements of the method of manufacturing a glass member. Starting from a structure shown in FIG. 3A, which corresponds to the cross-sectional view of FIG. 2B, a grinding step or CMP ("chemical mechanical polishing") step from the first main surface 110 may be performed so as to separate the adjacent members from each other. FIG. 3B shows an example of a resulting structure, in which two adjacent glass members are connected at the position corresponding to the depression 150 formed in the first main surface 110. Thereafter, adjacent members may be separated at the position of the depression 150 by means of sawing. FIG. 3C shows an example of a resulting structure after separating the adjacent glass members. As is shown, the single glass members 170 are separated from each other.

Figure 4:
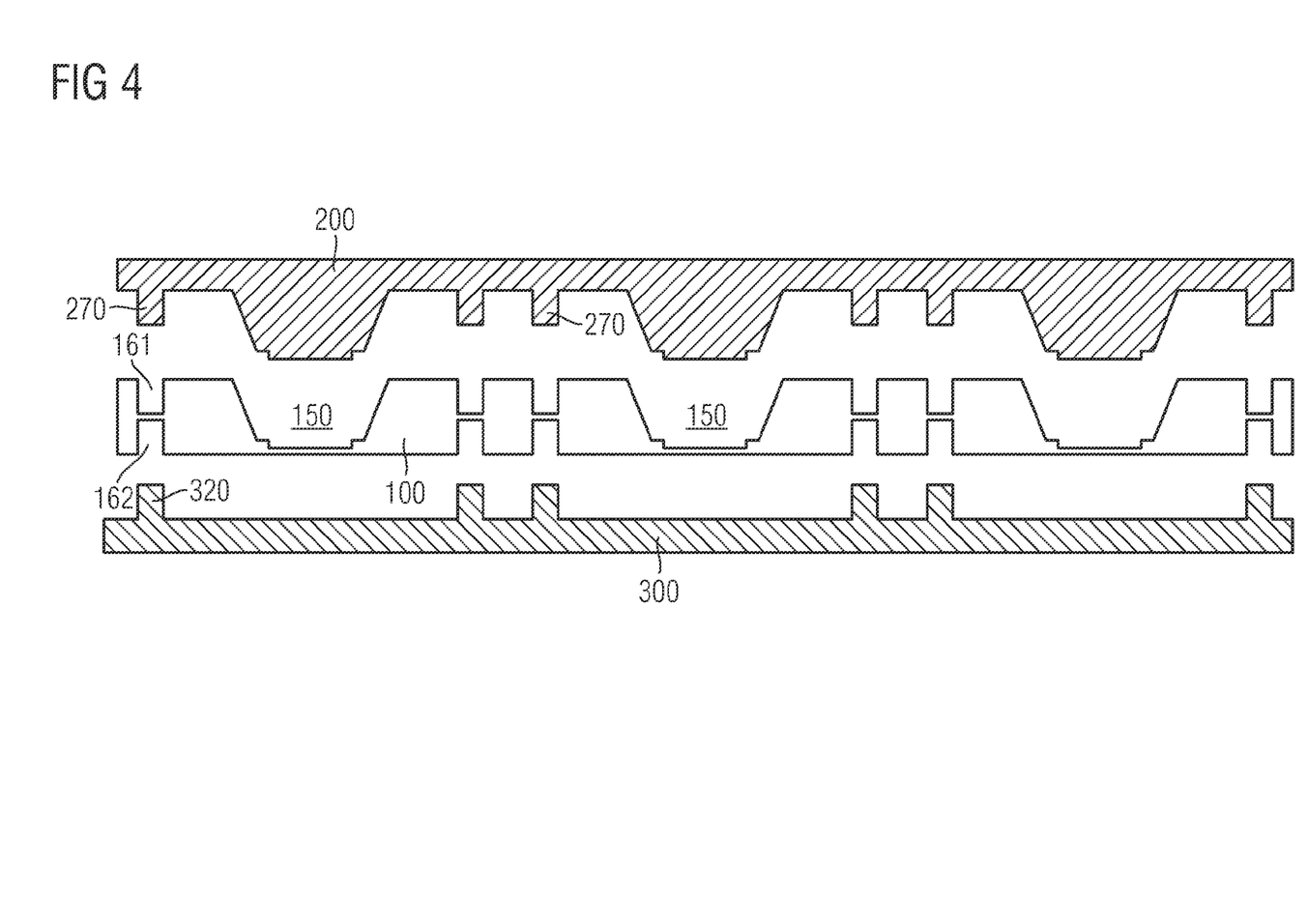
FIG. 4 schematically illustrates a further method of manufacturing a glass member, according to an embodiment.

FIG. 4 shows a further embodiment according to which a protruding portion 270 for separating the glass members is formed in the first working surface 210 of the first mold substrate 200. As is shown, when pressing the first and the second mold substrates 200, 300 together, first and second depressions 161, 162 are formed in each of the first main surface 110 and the second main surface 120 of the glass substrate 100, respectively. Thereafter, the glass members may be separated by breaking. According to this embodiment, the first and the second mold substrates 200, 300 should be correspondingly aligned so that the first and second depressions 161, 162 horizontally overlap with each other, i.e., there is a horizontal position at which the first and the second depressions 161, 162 are disposed.

As has been explained with references to FIGS. 1 to 4, a plurality of glass members may be manufactured in parallel by processing a single glass substrate and separating the single glass members thereafter. Due to the fact that the mold substrates have a patterned working surface, the pattern of the working surfaces may be transferred into the first and second main surface 110, 120 of the glass substrate 100.

This may be useful in a case in which the surface of the glass substrate is not to be processed by an etching or mechanical method. For example, the method described may be used for manufacturing an optical member having a very low degree of surface roughness. Due to the fact that the glass substrate is not processed using etching processes but the patterning is performed on the first mold substrate, the glass member may be appropriately shaped without degrading the surface thereof. Optionally, also the second working surface of the second mold substrate may be patterned. As a result, a glass member having a high quality of the surface including a low degree of surface roughness may be manufactured.

Moreover, the method described enables to implement special sizes of the glass member. For example, the glass member may have an arbitrary shape including a triangular shape having angles which are difficult to achieve with conventional patterning methods such as etching. Due to the feature that patterning the glass substrate is performed from the first main surface side 110 and the second main surface side 120, it is possible to separate adjacent members of the glass substrate by performing, e.g., a grinding process from the first main surface side 110. As a result, it is possible to process a plurality of glass members simultaneously. Further, due to this processing method, the second main surface of the glass substrate is not grinded or subjected to a treatment so that it maintains its optical properties. Further, due to the fact that the glass members may be separated by treating portions of the first main surface, mechanically methods for separating the optical members, e.g., sawing, may be dispensed with or avoided.

Figure 5:
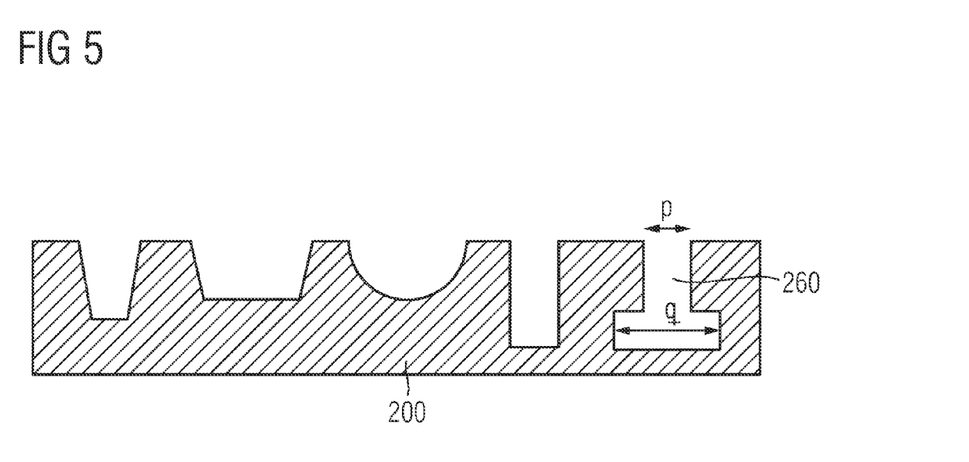
FIG. 5 shows an example of openings formed in a mold substrate, according to embodiments.

FIG. 5 shows an example of a cross-sectional view of a mold substrate. As is shown, the cavities 260 formed in the mold substrate may have an arbitrary shape, including angled structures as well as rounded structures, which may be suitable for forming lenses, for example. An upper diameter p of the opening 260 may be smaller than a lower width q of the opening. Due to the fact that the glass substrate is heated to the glass transition temperature, the liquefied glass flows and fills—with or without an applied external pressure—the entire of the opening 260.

According to a further embodiment, the optical members explained above may be integrated with further optical components, e.g., glass fibers.

Figure 6A:
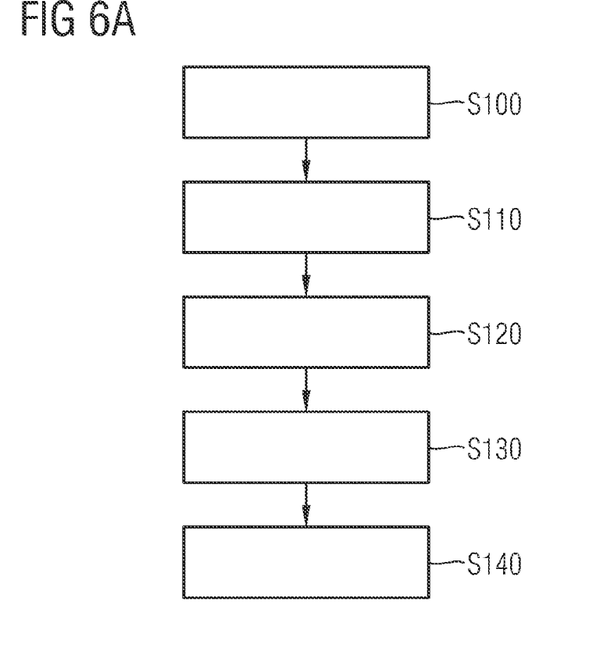
FIG. 6A summarizes a method, according to an embodiment.
Figure 6B:
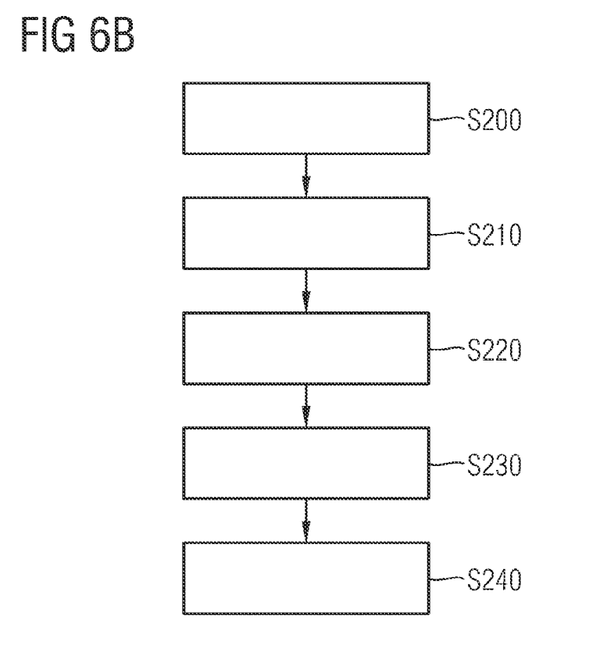
FIG. 6B summarizes a method, according to a further embodiment.

FIGS. 6A and 6B summarize methods according to embodiments. As is shown in FIG. 6A, a method of manufacturing a plurality of glass members comprises bringing a first main surface of a glass substrate in contact with a first working surface of a first mold substrate (S100), the first working surface being provided with a plurality of first protruding portions, bringing a second main surface of the glass substrate in contact with a second working surface of a second mold substrate (S110), the second working surface being provided with a plurality of second protruding portions, controlling (S120) a temperature of the glass substrate to a temperature above the glass-transition temperature to form the plurality of glass members, removing the first and second mold substrates from the glass substrate (S130) and separating adjacent ones of the plurality of glass members (S140). Bringing the first main surface of the glass substrate in contact with the first working surface of the first mold substrate may be performed before, after or simultaneously with bringing the second main surface of the glass substrate in contact with the second working surface of the second mold substrate.

As is further shown in FIG. 6B, a method of manufacturing a plurality of optical members comprises patterning a first working surface of a first mold substrate to form a plurality of first protruding portions (S200), bringing a first main surface of a glass substrate in contact with the first working surface of the first mold substrate (S210), bringing a second main surface of the glass substrate in contact with the second working surface of the second mold substrate (S220), controlling (S230) a temperature of the glass substrate to a temperature above a glass-transition temperature, and separating (S240) adjacent ones of the plurality of optical members. According to further embodiments, also the second working surface of the second mold substrate may be patterned. Patterning the first working surface of the first mold substrate may be performed before, after or simultaneously with patterning the second working surface of the second mold substrate. Bringing the first main surface of the glass substrate in contact with the first working surface of the first mold substrate may be performed before, after or simultaneously with bringing the second main surface of the glass substrate in contact with the second working surface of the second mold substrate.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of manufacturing a plurality of glass members, the method comprising:
   bringing a first main surface of a glass substrate in contact with a first working surface of a first mold substrate, the first working surface being provided with a plurality of first protruding portions;
   bringing a second main surface of the glass substrate in contact with a second working surface of a second mold substrate, the second working surface being provided with a plurality of second protruding portions;
   controlling a temperature of the glass substrate to a temperature above a glass-transition temperature to form the plurality of glass members;
   removing the first and the second mold substrates from the glass substrate; and
   separating adjacent ones of the plurality of glass members,
   wherein controlling the temperature of the glass substrate causes the glass substrate to conform to the first and second working surfaces of the first and second mold substrates, respectively, such that:
   a plurality of depressions is formed in the first main surface of the glass substrate, each of the depressions extending towards the second main surface and disposed between thicker sections of the glass substrate; and
   a plurality of kerfs is formed in the second main surface of the glass substrate, each of the kerfs extending towards the first main surface and disposed within the thicker sections of the glass substrate,
   wherein a thickness of the thicker sections is locally minimized by each of the kerfs.

2. The method according to claim 1, further comprising pressing the first and the second mold substrates together, while the temperature of the glass substrate is controlled to the temperature above the glass-transition temperature.

3. The method according to claim 1, wherein the temperature of the glass substrate is controlled to a temperature above a Littleton point of the glass substrate.

4. The method according to claim 1, wherein adjacent glass members are separated at positions corresponding to positions of the second protruding portions.

5. The method according to claim 1, wherein adjacent glass members are separated by removing material of the glass substrate from the first main surface of the glass substrate.

6. The method according to claim 1, wherein the first and the second mold substrate comprise a metal, ceramic or Si.

7. The method according to claim 1, wherein at least one of the first protruding portions has a shape of a trapezoid having two legs and a base protruding from the first mold substrate.

8. The method according to claim 7, wherein an angle between the base and each of the legs is selected in accordance with a depression to be formed in the first main surface of the glass substrate.

9. The method according to claim 1, wherein a shape of the first protruding portion is selected to conform with the depressions to be formed in the first main surface of the glass substrate.

10. The method according to claim 1, wherein, as a result of controlling the temperature of the glass substrate to the temperature above the glass-transition temperature, at least one of the glass members comprises a surface portion having a low degree of surface roughness, the surface portion forming a surface of one of the depressions.

11. The method according to claim 1, further comprising aligning the glass substrate, the first and the second mold substrates, so that the second protruding portions have a predetermined spatial relationship with respect to the first protruding portions.

12. The method according to claim 1, wherein the glass substrate causes the glass substrate to conform to the second working surface such that the second main surface such that each of the kerfs are separated by a planar outer surface of the second main surface.

13. The method according to claim 12, wherein each of the kerfs comprise planar sidewalls intersecting the planar outer surface and extending towards the first main surface.

14. The method according to claim 1, further comprising separating the glass substrate into the plurality of glass members, wherein after the separating of the glass substrate, each of the glass members comprises one of the depressions and a portion of the thicker sections on either side of the one of the depressions.

15. A method of manufacturing a plurality of optical members, comprising:
    patterning a first working surface of a first mold substrate to form a plurality of first protruding portions;
    bringing a first main surface of a glass substrate in contact with the first working surface of the first mold substrate;
    bringing a second main surface of the glass substrate in contact with a second working surface of a second mold substrate;
    controlling a temperature of the glass substrate to a temperature above a glass-transition temperature to form a plurality of optical members, and
    separating adjacent ones of the plurality of optical members,
    wherein controlling the temperature of the glass substrate causes the glass substrate to conform to the first and second working surfaces of the first and second mold substrates, respectively, such that:
    a plurality of depressions is formed in the first main surface of the glass substrate, each of the depressions extending towards the second main surface and disposed between thicker sections of the glass substrate; and
    a plurality of kerfs is formed in the second main surface of the glass substrate, each of the kerfs extending towards the first main surface and disposed within the thicker sections of the glass substrate,
    wherein a thickness of the thicker sections is locally minimized by each of the kerfs.

16. The method according to claim 15, further comprising patterning the second working surface of the second mold substrate to form a plurality of protruding portions.

17. The method according to claim 16, further comprising aligning the glass substrate, the first and the second mold substrates, so that the depressions have a predetermined spatial relationship with respect to the openings.

18. The method according to claim 15, wherein the first working surface is patterned so that a light reflective or light transmissive surface of at least one of the optical members forms a surface of at least one of the depressions.

19. The method according to claim 15, wherein the glass substrate causes the glass substrate to conform to the second working surface such that the second main surface such that each of the kerfs are separated by a planar outer surface of the second main surface.

20. The method according to claim 19, wherein each of the kerfs comprise planar sidewalls intersecting the planar outer surface and extending towards the first main surface.

21. The method according to claim 15, further comprising separating the glass substrate into the plurality of glass members, wherein after the separating of the glass substrate, each of the glass members comprises one of the depressions and a portion of the thicker sections on either side of the one of the depressions.

* * * * *